US007048263B2

(12) United States Patent
Ahlqvist

(10) Patent No.: US 7,048,263 B2
(45) Date of Patent: May 23, 2006

(54) SEPARATED POCKET SPRING MATTRESS

(75) Inventor: Robert Ahlqvist, Vårgårda (SE)

(73) Assignee: Stjernfjädrar AB, Herrljunga (SE)

( * ) Notice: Subject to any disclaimer, the term of this patent is extended or adjusted under 35 U.S.C. 154(b) by 0 days.

(21) Appl. No.: 10/416,350

(22) PCT Filed: Nov. 23, 2001

(86) PCT No.: PCT/SE01/02587

§ 371 (c)(1),
(2), (4) Date: Jul. 16, 2003

(87) PCT Pub. No.: WO02/44077

PCT Pub. Date: Jun. 6, 2002

(65) Prior Publication Data

US 2004/0025257 A1 Feb. 12, 2004

(30) Foreign Application Priority Data

Nov. 30, 2000 (SE) .................................. 0004412

(51) Int. Cl.
*F16F 3/04* (2006.01)
*A47C 23/043* (2006.01)

(52) U.S. Cl. ........................................... 267/91; 5/720

(58) Field of Classification Search .................... 5/720, 5/655.8, 716, 655.7; 267/91, 94, 93, 97, 267/80, 81, 89

See application file for complete search history.

(56) References Cited

U.S. PATENT DOCUMENTS

| | | | | |
|---|---|---|---|---|
| 2,048,979 | A * | 7/1936 | Leonard et al. | 5/655.8 |
| 2,359,003 | A * | 9/1944 | Sawyer | 267/84 |
| 3,099,021 | A * | 7/1963 | Wetzler | 5/720 |
| 3,633,228 | A * | 1/1972 | Zysman | 5/655.8 |
| 4,485,506 | A | 12/1984 | Stumpf et al. | |
| 6,131,892 | A | 10/2000 | Stumpf | |
| 6,256,820 | B1 * | 7/2001 | Moser et al. | 5/655.8 |
| 6,315,275 | B1 * | 11/2001 | Zysman | 267/89 |
| 6,398,199 | B1 * | 6/2002 | Barber | 267/93 |

FOREIGN PATENT DOCUMENTS

| | | |
|---|---|---|
| EP | 0 089 789 A1 | 9/1983 |
| WO | WO-99/32396 | 7/1999 |

* cited by examiner

*Primary Examiner*—Michael Safavi
(74) *Attorney, Agent, or Firm*—Birch, Stewart, Kolasch & Birch, LLP

(57) ABSTRACT

A spring mattress comprising a plurality of interconnected coil springs (1) enclosed in covers (2), known as a pocket-spring mattress, is described, wherein at least two springs that are located adjacent to one another are spaced apart by an interjacent separation distance (SA), said separation distance exceeding approximately 10% of the diameter of the largest one of the spiral turns of the adjacent springs. Also described is a method of manufacturing a corresponding mattress.

38 Claims, 2 Drawing Sheets

SEPARATED POCKET SPRING MATTRESS

This application is the national phase under 35 U.S.C. §371 of PCT International Application No. PCT/SE01/02587 which has an International filing date of Nov. 23, 2001, which designated the United States of America.

TECHNICAL FIELD OF INVENTION

The present invention relates to a spring mattress of the kind wherein the springs are enclosed in covers, known as a pocket-spring mattress, and to method of manufacturing a mattress of this kind.

BACKGROUND OF THE INVENTION

One common technique of manufacturing spring mattress is the one known as the pocket technique. According to this technique, the springs are enclosed in pockets, i.e. they are enclosed individually by a cover material. Owing to this arrangement, the springs become relatively resilient individually, such that each spring may flex separately without affecting adjacent springs, which increases the user's comfort, since the load will be distributed more evenly across the surface that receives the load.

One problem inherent in this type of mattresses is, however that they are a great deal more expensive to manufacture than many other types of spring mattresses.

Consequently, there is a need for a mattress that is easier and/or cheaper to manufacture while at the same time offering comfort at least equivalent to that found in prior-art pocket-spring mattresses.

OBJECT OF THE INVENTION

One of the objects of the present invention therefore is to provide a spring mattress of the kind defined in the introduction, and a method of manufacturing said mattress, by means of which the disadvantages referred to above are completely or at least partly removed.

This object is achieved in a spring mattress and by means of a method of manufacturing said mattress in the manner defined in the appended claims.

SUMMARY OF THE INVENTION

The invention relates to a spring mattress comprising a plurality of interconnected coil springs enclosed in covers, at least two springs located adjacent to one another being spaced apart by an interjacent separation distance, said separation distance exceeding approximately 10% of the diameter of the largest one of the spiral turns of the adjacent springs.

In this manner, a spring mattress is obtained which at least in some places exhibits separation distances between the springs, making the mattress less compact. Consequently, fewer springs are required, the operational step of enclosing the springs in covers becomes easier and so on. The mattress thus becomes both easier and less expensive to manufacture. Surprisingly enough it has been found, however that the properties of the mattress are not noticeably affected from being less compact but that essentially the same qualities of comfort are achieved in the inventive mattress as in conventional pocket-spring mattresses. In fact, it has even been found that in some cases the increased distance between the springs adds to the individual resilience of the spring, which increases comfort, since each individual spring is able to support loads comparatively independently.

In prior-art pocket-spring mattresses the springs may be spaced apart by a certain separation distance but normally this distance amounts to a few millimeters only, sufficient to accommodate a thin weld seam. In addition, in prior-art mattress structures the number of springs may be reduced by using larger springs. In practical terms, this solution is, however unsuitable as doing so substantially affects the properties of the mattress.

It is particularly preferable that the separation distance is larger than 15% of the largest one of the spiral turns of the springs that are located next to one another, and preferably larger than 20%. In addition, it is preferable that the separation distance is larger than 1 cm. In this manner a less compact mattress is obtained, which makes the latter even less expensive and more simple to manufacture.

It is likewise preferable that the covers enclosing adjacent springs are spaced apart by an intermediate separation distance (SB) that exceeds 10% of the diameter of the largest one of the spiral turns of the adjacent springs, and preferably exceeds 15% and most preferably exceeds 20%.

In this manner, much of the separation distance will consist of material located externally of the enclosing cover parts, which does not negatively affect the enclosure-dependant stability offered the springs.

A particularly preferred feature is to form the mattress with a plurality of springs that are arranged in strips made from the cover material, several such strips being joined together. In this manner, the separation feature is obtained in that at least most, and preferably essentially all springs arranged in at least one strip are separated from one another. This is achieved in that the separation distance is formed by joining-together the cover material in a lengthwise extended interconnection on each side of the springs or by providing two interconnection lines for joining-together the cover material on each side of the springs, said lines being spaced apart in the longitudinal direction of the strips.

This makes it easy to achieve the separation feature without having to supply additional separation material.

It is particularly preferred that mattresses in accordance with the invention have a spring density in at least one lengthwise direction, in which separation distances are provided, of less than 15 springs per meter, and preferably less than 13 springs per meter. The resulting mattress is a great deal more simple and less expensive than conventional mattresses, which as a rule have 30 springs and more in the lengthwise direction of the mattress.

The invention likewise concerns a method of manufacturing a mattress of the kind defined above. The method comprises the steps of enclosing the springs in a cover material; and interconnecting the springs with one another, whereby at least two springs that are located adjacent to one another are interconnected in such a manner that an interjacent separation distance is formed between the springs, said separation distance exceeding about 10% of the diameter of the largest one of the spiral turns of springs located adjacent to one another.

DETAILED DESCRIPTION OF PREFERRED EMBODIMENTS

Figure 1:
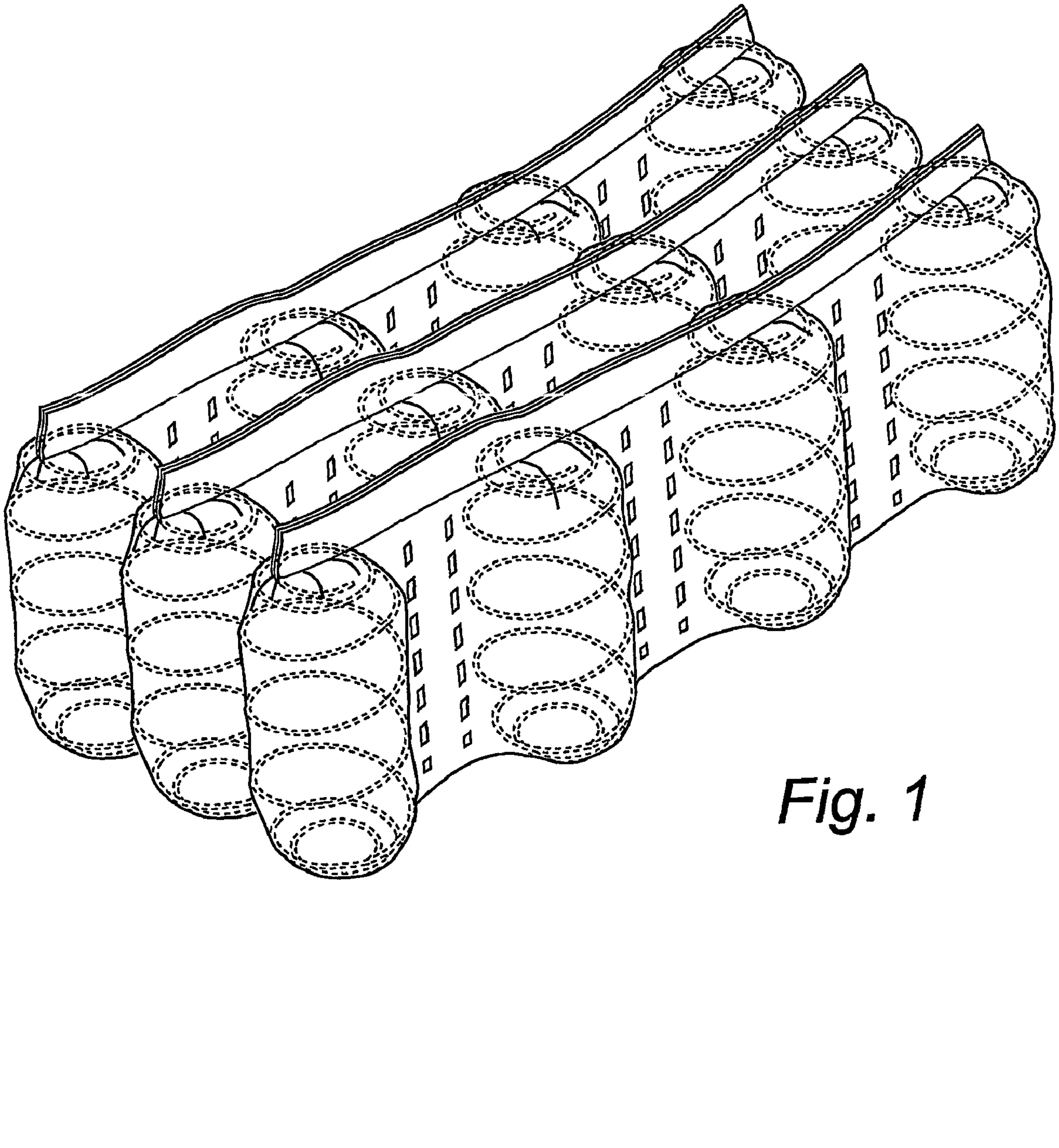
FIG. 1 shows a spring mattress designed in conformity with the invention.

The invention will be described in the following for exemplifying purposes by way of one embodiment and with reference to the accompanying drawings.

A spring mattress in accordance with the invention comprises a plurality of interconnected coil springs 1, which are enclosed in covers 2. Suitably, the cover is made from a preferably weldable textile fabric but other materials, such as various types of plastic material could equally well be used. It is likewise possible to use non-weldable textile fabrics, such as cotton fabrics. Normally, strips 3 of interconnected, cover-enclosed pocket springs are manufactured automatically, whereupon the strips are cut into suitable lengths and joined together side by side to form mattresses.

Preferably, the covers are dimensioned to ensure that the maximum enclosed height amounts to at least 3 cm and preferably to at least 5 cm.

Coil springs of many different sizes could be used in conjunction with the present invention, and in principle any desired spring size, large or small, may be used. Preferably, however springs are used having a diameter of 2–10 cm, and most preferably a diameter of 6 cm. Preferably the springs comprises at least four spiral turns and preferably fewer than 10 spiral turns. In addition, it is an advantage to manufacture the springs from helically coiled wires having a thickness in the range between 0.5 and 3.00 mm and preferably a wire thickness in the range of 1.5 to 2.2 mm.

In the spring mattress in accordance with the invention at least at least two adjacent springs are spaced apart by an interjacent separation distance SA, said separation distance exceeding 10% of the diameter of the largest one of the spiral turns of the adjacent springs, and preferably it exceeds 15% of the diameter of the largest one of the spiral turns of adjacent springs, and preferably exceeds 20%. In addition, the separation distance preferably exceeds 1 cm. Preferably also the covers enclosing adjacent springs are spaced apart by an intermediate separation distance SB, said separation distance exceeding 10% of the diameter of the largest one of the spiral turns of the adjacent springs, and preferably exceeding 15% and most preferably exceeding 20%. In addition, the separation distance SB preferably also is larger than 1 cm.

Figure 2:
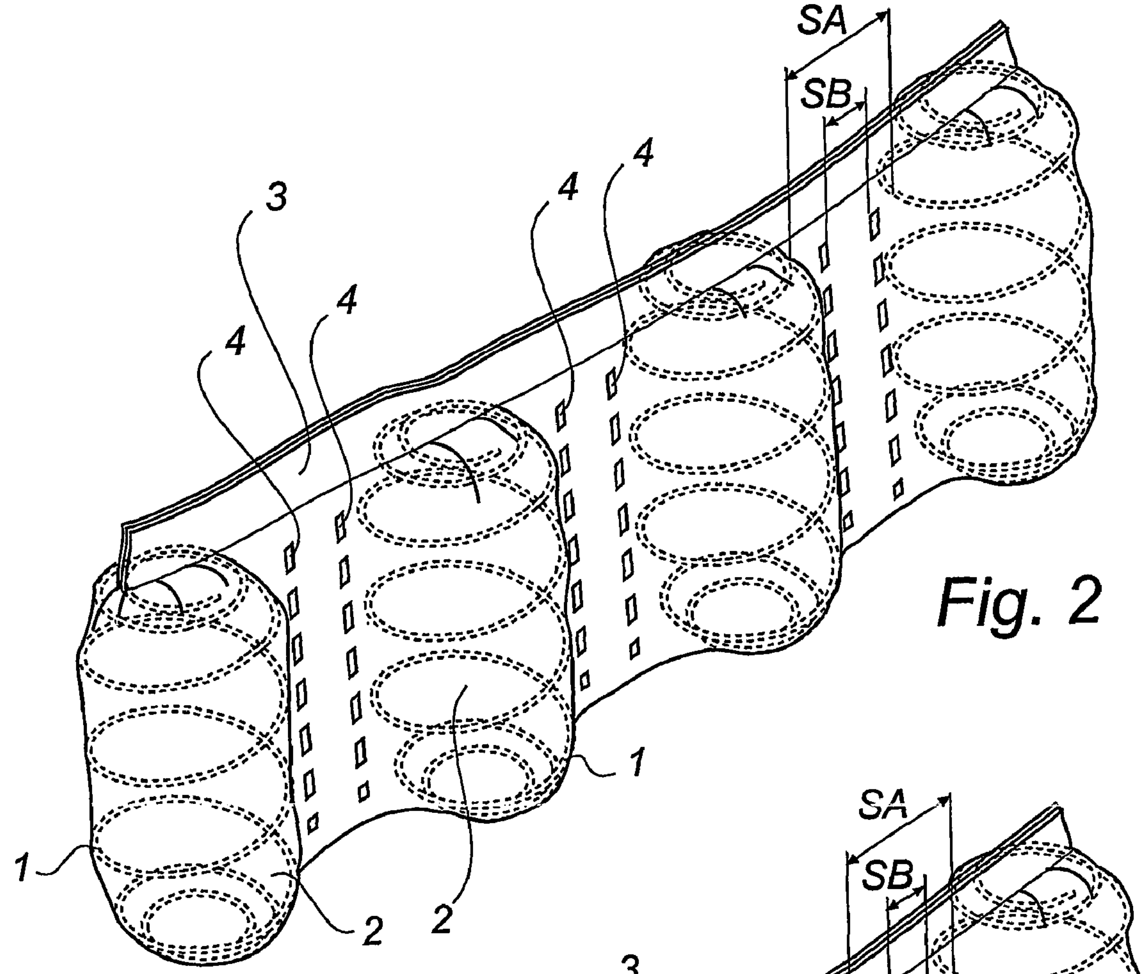
FIG. 2 shows a strip comprising separated springs in accordance with a first embodiment to be used in a mattress in accordance with the invention.
Figure 3:
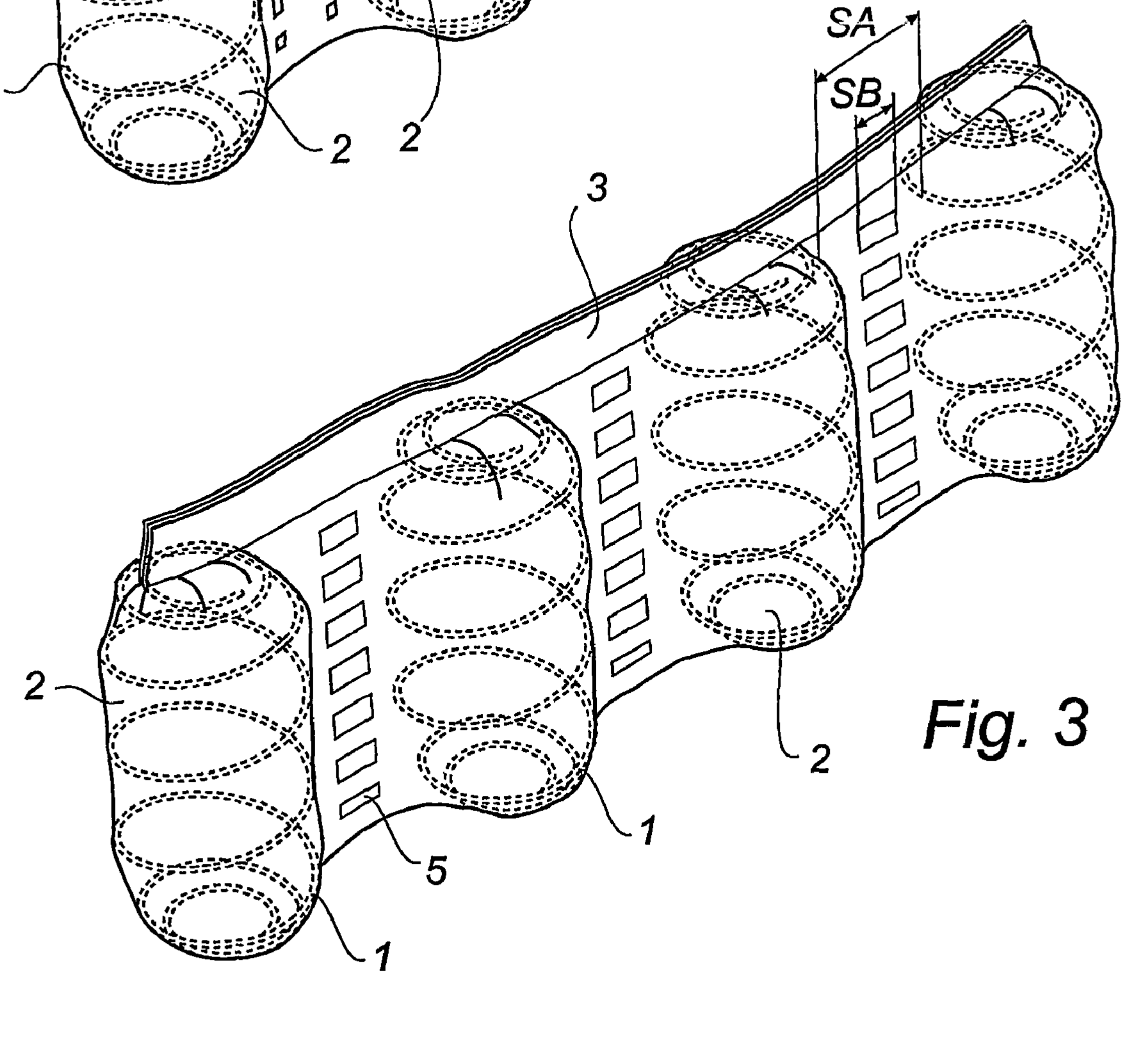
FIG. 3 shows a strip comprising separated springs in accordance with a second embodiment to be used in a mattress in accordance with the invention.

These separation distances preferably are arranged between essentially all springs in the lengthwise direction of the mattress. This may be achieved by arranging two joining-together lines 4 that are spaced apart in the lengthwise direction of the strips as illustrated in FIG. 2, so as to join-together the cover material on each side of the springs. Alternatively, it is instead possible to provide one or several interconnection means 5 to join-together the cover material in an interconnection extended in the lengthwise direction of the strips on each side of the springs, which interconnection means could be e.g. a wide weld seam, as illustrated in FIG. 3. Likewise, it is possible to use continuous welding lines instead of spot-welded seams, as shown in FIGS. 2 and 3, Other types of interconnections are possible too, such as one or several stitched seams.

The springs could, however also be separated in other ways, such as by introducing separation members or the like between the strips.

The invention makes it possible to use less than 30 springs and preferably about 25 springs and most preferably about 22 springs in mattresses having a length in excess of 180 cm. It is also preferable that in the mattresses in accordance with the invention the density of springs in the lengthwise direction or directions, in which the separation distances are provided, is less than 15 springs per meter and preferably is less than 13 springs per meter.

In the manufacture of mattresses in accordance with the invention, the springs are enclosed in a cover material. Thereafter, or in conjunction with the enclosing step, the springs are interconnected with one another to form mattresses. In this operation, care is taken to ensure that at least two springs located adjacent to one another are interconnected in such a manner that an interjacent spring-separation distance is formed between the springs the length of which exceeds 10% of the diameter of the largest one of the spiral turns of the adjacent springs.

It is particularly advantageous to interconnect the springs by arranging a plurality of springs in strips formed by the cover material and to join-together several strips of this kind. The separation of the springs may be effected by joining-together the cover material in a lengthwise extended interconnection of the strips on each side of the springs, or by arranging two interconnection lines for joining-together the cover material on each side of the springs, which are separated in the lengthwise direction of the strips.

As already mentioned the covers comprising springs preferably are arranged in successive rows, whereupon such rows are attached to one another side by side as indicated in FIG. 1. Preferably, the rows are attached to one another in 2–3 vertically spaced attachment points opposite the associated spring. A larger or smaller number of attachment points could of course also be used. It is likewise possible to use one long attachment line extending essentially in parallel with the longitudinal direction of the springs instead of several, shorter attachment points. It is likewise possible to join-together the strips by means of a string of glue or the like extending in the direction of extension of the strips. The joining-together of rows side by side in succession could be effected by welding or gluing, as mentioned previously. Other alternative joining-together means could be used, such as clamps, Velcro tapes or some other suitable joining-together method be used. It is likewise possible to attach the rows to one another by using interconnecting sheets at the upper and lower faces of the springs. The sheets could be made from a textile material and be attached by means of gluing or welding.

By joining-together the strips in this way opposite the springs in the respective strip the separation distances will be positioned in alignment with one another. This position is the preferred one, although it is likewise possible to arrange the strips in such a manner that the springs will be staggered, i.e. positioned offset relative to one another. In the latter case the springs as a whole may be arranged more densely across the mattress than is the case in conventional pocket-spring mattresses, although as a rule this is not desirable.

It is also possible to use differently-sized separation distances in different zones or areas of the mattress and to use e.g. larger separation distances in areas that in normal use of the mattress are less exposed to load, and smaller separation distances in areas exposed to more heavy loads.

The mattress in accordance with the invention offers resilience properties equivalent to those achieved in conventional pocket-spring mattresses, providing the same firmness, comfort and so on. Possibly somewhat harder springs than normal may be used to increase the mattress firmness.

The invention has been described above with reference to one embodiment. Several varieties of the invention are possible, however. For example, other cover materials may be used as also differently-sized springs, and so on. Such close varieties should be considered to be within the scope of protection of the invention as defined in the appended claims.

What is claimed is:

1. A spring mattress comprising a plurality of interconnected coil springs enclosed in covers, at least two springs that are located adjacent to one another being spaced apart by an interjacent separation distance (SA), said separation distance exceeding approximately 10% of the diameter of the largest one of the spiral turns of the adjacent springs, the covers enclosing adjacent springs being spaced apart by an interjacent separation distance (SB), said separation distance exceeding 15% of the diameter of the largest one of the spiral turns of the adjacent springs, the springs having helically coiled wires with a thickness in the range of between 0.5 and 3.0 mm, the spiral turn of the springs having the largest diameter having a diameter size of 2–10 cm, the density of springs in at least one lengthwise direction, in which separation distances are provided, being less than 15 springs per meter.

2. The spring mattress as claimed in claim 1, wherein said separation distance (SA) exceeds 15% of the diameter of the largest one of the spiral turns of the adjacent springs.

3. The spring mattress as claimed in claim 1 or 2, wherein the separation distance (SA) exceeds 1 cm.

4. A spring mattress as claimed in claim 1, wherein the an interjacent separation distance (SB) exceeds 20% of the diameter of the largest one of the spiral turns of the adjacent springs.

5. The spring mattress as claimed in claim 1, wherein the mattress comprises a plurality of springs arranged in strips of the cover material, several strips of this kind being joined together.

6. The spring mattress as claimed in claim 5, wherein at least most springs in at least one strip are separated from one another.

7. The spring mattress as claimed in claim 6, wherein the springs in a majority of the strips are separated from one another.

8. The spring mattress as claimed in any one of claims 5–7, wherein the separation distance (SB) is achieved by joining-together the cover material in a joint extended in the lengthwise direction of the strips on each side of the springs.

9. The spring mattress as claimed in any one of claims 5–7, wherein the separation distance (SB) is achieved by two interconnection lines for joining-together the cover material on each side of the springs, said lines being spaced apart in the lengthwise direction of the strips.

10. The spring mattress as claimed in claim 5, wherein the strips are arranged in parallel with the lengthwise direction of the mattress.

11. The spring mattress as claimed in claim 1, wherein the springs comprise at least four spiral turns.

12. The spring matter as claimed in claim 1, wherein the cover is made from a weldable textile fabric, the joining-together being effected by welding.

13. The spring mattress as claimed in claim 1, wherein said separation distance (SA) exceeds 20% of the diameter of the largest one of the spiral turns of the adjacent springs.

14. The spring mattress as claimed in claim 1, wherein the spiral turn of the springs having the largest diameter has a diameter size of 6 cm.

15. The spring mattress as claimed in claim 1, wherein the springs comprise fewer than 10 spiral turns.

16. The spring mattress as claimed in claim 1, wherein the helically wiled wires of the springs have a thickness in the range of between 1.5 and 2.2 mm.

17. A spring mattress comprising a plurality of interconnected coil springs enclosed in covers, wherein at least two springs that are located adjacent to one another are spaced apart by an interjacent separation distance (SA), said separation distance exceeding approximately 10% of the diameter of the largest one of the spiral turns of the adjacent springs and the density of springs in at least one lengthwise direction, in which separation distances are provided, being less than 15 springs per meter, the springs having helically coiled wires with a thickness in the range of between 0.5 and 3.0 mm,the spiral turn of the springs having the largest diameter having a diameter size of 2–10 cm.

18. The spring mattress as claimed in claim 17, wherein the density of spring in the at least one lengthwise direction, in which separation distances are provided, is less than 13 springs per meter.

19. The spring mattress as claimed in claim 17, wherein the springs comprise at least four spiral turns.

20. The spring mattress as claimed in claim 17, wherein the cover is made from a weldable textile fabric, the joining-together being effected by welding.

21. A method of manufacturing a spring mattress of the kind comprising a plurality of interconnected coil springs, which are enclosed in covers, comprising the steps of:

enclosing the springs in a cover material; and interconnecting the springs with one another by interconnecting at least two springs located adjacent to one another in such a manner That an interjacent separation distance (SA) is formed between the springs, said separation distance (SA) exceeding about 10% of the diameter of the largest one of the spiral turns of springs located adjacent to one another, the covers enclosing adjacent springs being spaced apart by an interjacent separation distance (SB), said separation distance exceeding 15% of the diameter of the largest one of the spiral turns of the adjacent springs, the springs having helically coiled wires with a thickness in the range of between 0.5 and 3.0 mm, the spiral turn of the springs having the largest diameter having a diameter size of 2–10 cm, the density of springs in at least one lengthwise direction, in which separation distances are provided, being less than 15 springs per meter.

22. The method as claimed in claim 21, wherein the separation distance exceeds 15% of the diameter of the largest one of the spiral turns of springs located adjacent to one another.

23. The method as claimed in claim 21 or 22, wherein said separation distance is larger than 1 cm.

24. The method as claimed in claim 21, wherein the step of interconnecting the springs comprises arranging a plurality of springs in strips made by the cover material, several such strips being joined together.

25. The method as claimed in claim 24, wherein separating the springs is achieved by joining-together the cover material with a joint with an extension in the lengthwise direction of the strips on each side of the springs.

26. The method as claimed in claim 24, wherein the separation distance is achieved by two interconnection lines for joining-together the cover material on each side of the springs, said lines being spaced apart in the lengthwise direction of the strips.

27. The method as claimed in any one of claims 25–26, wherein the cover is made from a weldable textile material, said joining-together being effected by welding.

28. The method as claimed in claim 21, wherein the separation distance exceeds 20% of the diameter of the largest one of the spiral turns of springs located adjacent to one another.

29. The spring mattress as claimed in claim 21, wherein the step of interconnecting the springs comprises arranging a plurality of springs in strips made by the cover material, several such strips being joined together.

30. A method of manufacturing a spring mattress of the kind comprising a plurality of interconnected coil springs, which are enclosed in covers, comprising the steps of:

enclosing the springs in a cover material; and interconnecting the springs with one another by interconnecting at least two springs located adjacent to one another in such a manner that an interjacent separation distance (SA) is formed between the springs, said separation distance (SA) exceeding about 10% of the diameter of the largest one of the spiral turns of springs located adjacent to one another, the density of springs in at least one lengthwise direction, in which separation distances are provided is less than 15 springs per meter, the springs having helically coiled wires with a thickness in the range of between 0.5 and 3.0 mm, the spiral turn of the springs having the largest diameter having a diameter size of 2–10 cm.

31. The spring mattress as claimed in claim 30, wherein the density of springs in that at least one lengthwise direction, in which separation distances are provided, is less than 13 springs per meter.

32. The spring mattress as claimed in claim 30, wherein the separation distance exceeds 15% of the diameter of the largest one of the spiral turns of springs located adjacent to one another.

33. The spring mattress as claimed in claim 30, wherein the separation distance exceeds 20% of the diameter of the largest one of the spiral turns of springs located adjacent to one another.

34. The spring mattress as claimed in claim 30, wherein said separation distance is larger than 1 cm.

35. The spring mattress as claimed in claim 30, wherein the step of interconnecting the springs comprises arranging a plurality of springs in strips made by the cover material, several such strips being joined together.

36. The spring mattress as claimed in claim 35, wherein separating the springs is achieved by joining-together the cover material with a joint with an extension in the lengthwise direction of the strips on each side of the springs.

37. The spring mattress as claimed in claim 35, wherein the separation distance is achieved by two interconnection lines for joining-together the cover material on each side of the springs, said lines being spaced apart in the lengthwise direction of the strips.

38. The spring mattress as claimed in claim 35, wherein the cover is made from a weldable textile material, said joining-together being effected by welding.

* * * * *